United States Patent [19]

Nakanishi

[11] Patent Number: 5,048,982
[45] Date of Patent: Sep. 17, 1991

[54] ROTARY STRUCTURE

[75] Inventor: Tsutomu Nakanishi, Kunitachi, Japan

[73] Assignee: C.S.U. Ltd., Tokyo, Japan

[21] Appl. No.: 596,090

[22] Filed: Oct. 11, 1990

Related U.S. Application Data

[60] Division of Ser. No. 544,038, Jun. 28, 1990, which is a continuation of Ser. No. 7,639, Jan. 27, 1987, abandoned.

[30] Foreign Application Priority Data

Jan. 29, 1986 [JP] Japan ................................. 61-12332

[51] Int. Cl.$^5$ ............................................. F16C 19/10
[52] U.S. Cl. .................................... 384/613; 384/615; 384/512; 384/514
[58] Field of Search ............... 384/615, 613, 514, 513, 384/512, 543, 546

[56] References Cited

U.S. PATENT DOCUMENTS

| 870,276 | 11/1907 | Dackiewicz | 384/514 |
| 3,068,480 | 12/1962 | Fisher et al. | 384/512 |
| 4,603,983 | 8/1986 | Hofmann et al. | 384/517 |
| 4,969,754 | 11/1990 | Rohrer et al. | 384/512 |

Primary Examiner—Lenard A. Footland
Attorney, Agent, or Firm—Ladas & Parry

[57] ABSTRACT

This invention relates to a rotary structure adapted to be used as a spindle unit for a miniature motor or miniature rotor or as a tape guide roller for a VTR. In the structure of the rotary mechanism, instead of a conventional expensive radial ball bearing, a substantially V-shaped groove is formed on a shaft itself so as to hold balls provided between this groove and the tapered surface or concave spherical ball receiving surface of an outer race provided around the groove.

6 Claims, 16 Drawing Sheets

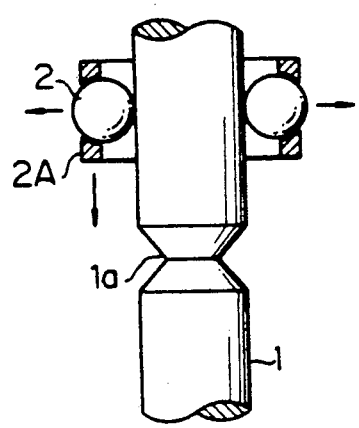
FIG.17①
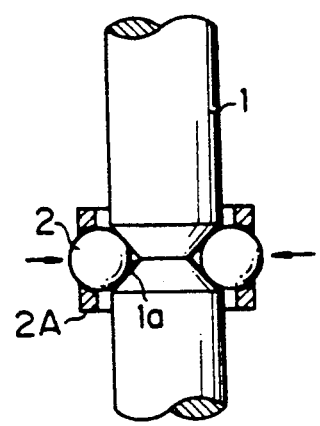
FIG.17②
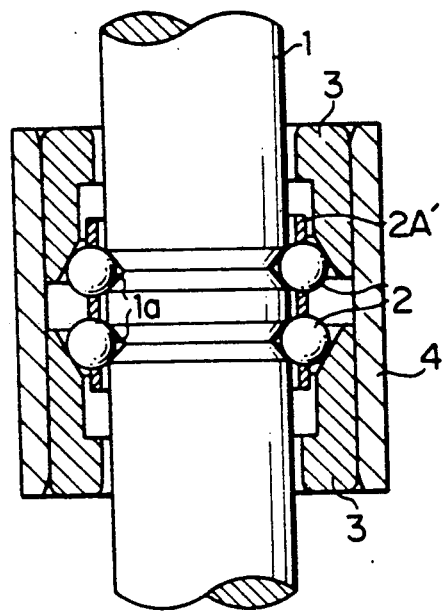
FIG.18

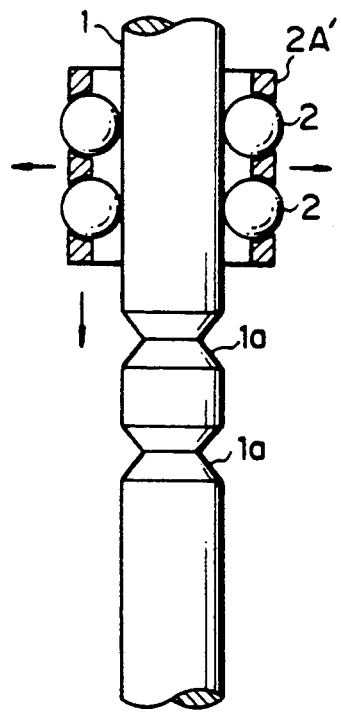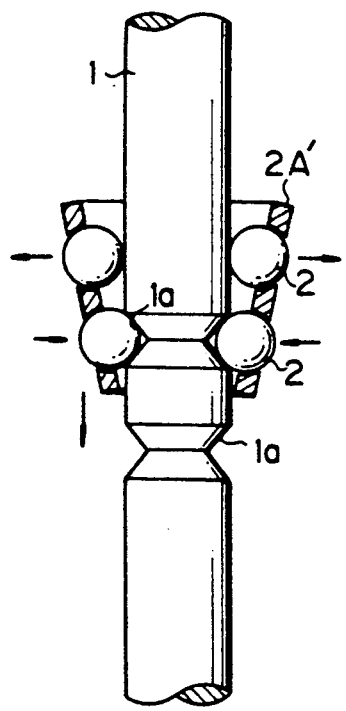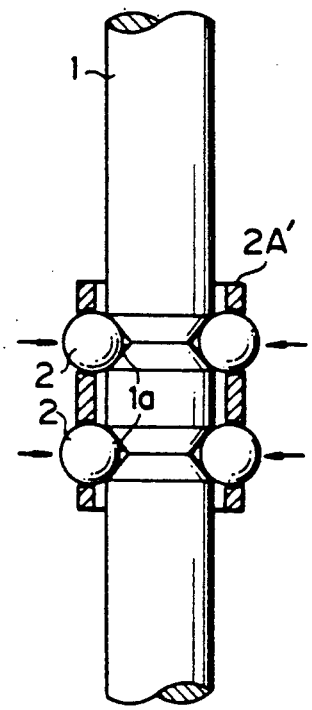
FIG.19① FIG.19② FIG.19③

FIG.20①
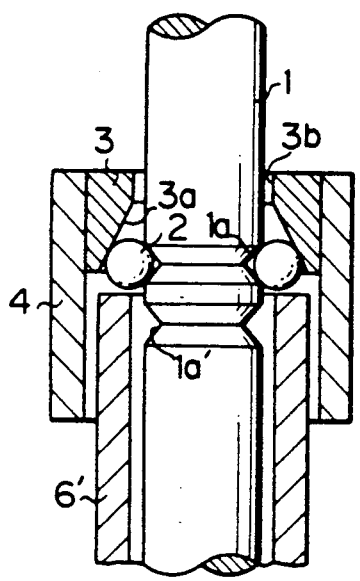
FIG.20③
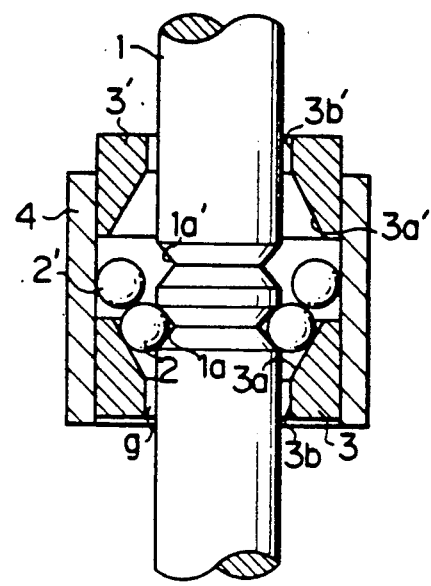
FIG.20②
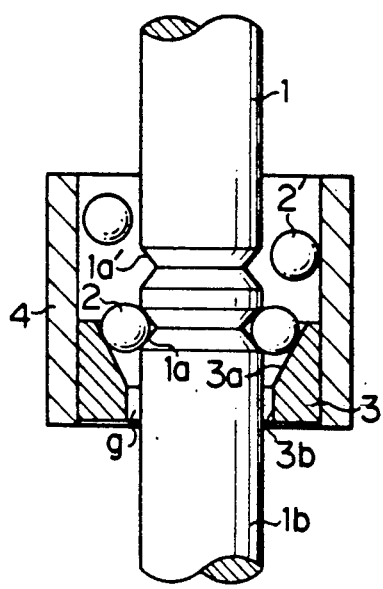
FIG.20④
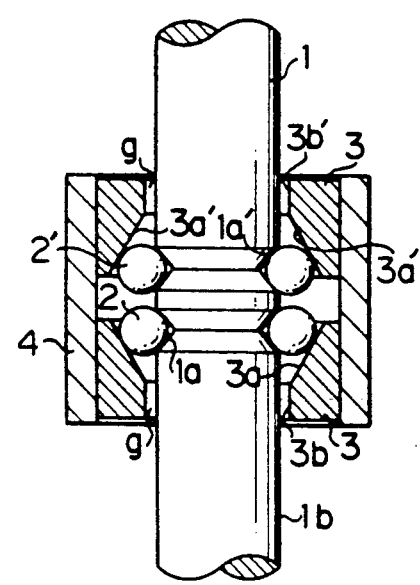

ROTARY STRUCTURE

This is a divisional of copending application Ser. No. 07/544,038 filed June 28, 1990 which is a continuation application of Ser. No. 07/007,639 filed on Jan. 27, 1987 (now abandoned).

BACKGROUND OF THE INVENTION

A spindle unit used for a miniature motor or miniature rotor has been conventionally formed as shown in FIG. 27.

Therein, a pair of radial ball bearings 21 and 22 are arranged at the upper and lower parts of the outer periphery of a shaft 20, a cylindrical spacer 23 is arranged between the outer races 21a and 22a of these radial ball bearings 21 and 22 to position the radial ball bearings 21 and 22 with respect to each other, these being fixed within the bore H of a bearing housing 24. A rotor 25 in the form of a pulley, disc or turntable is fixed to the end of the shaft 20 to drive the shaft in rotation.

The rotary mechanism of a conventional tape guide roller has been formed substantially the same.

Moreover, in the above mentioned construction, in order to prevent dust or the like from entering the radial ball bearings 21 and 22 and reducing their performance, a so-called double sealing structure is provided wherein sealing members S are arranged on both sides of balls 21c or 22c within each of the radial ball bearings 21 and 22.

The radial ball bearings 21 and 22 have many component parts, are complicated to assemble and are high in the cost. There is a deficiency in that the clearances (in four places) of the radial ball bearings 21 and 22 allow the shaft 20 to pivot in rotation.

SUMMARY OF THE INVENTION

This invention seeks to solve the above mentioned deficiencies and has as an object to provide a rotary structure wherein the formation of radial ball bearing parts is simplified, manufacturing and assembling operations are made easy and the cost is reduced.

Another object of the present invention is to provide a rotary structure wherein the inner race and shaft are made integral so as to be small and light, to make the ball diameter larger than heretofore and to improve the rigidity.

Further, another object of the present invention is to provide a rotary structure wherein, by finely adjusting the position of the outer race in assembling, the clearance can be easily adjusted and the precision can be improved.

BRIEF DESCRIPTION OF THE DRAWINGS

FIGS. 17(1) and (2) are explanatory views of assembling states.

FIG. 18 shows the fourteenth embodiment of the present invention.

FIGS. 19(1) to (3) are explanatory views of assembly states.

FIGS. 20(1) to (4) show the fifteenth embodiment of the present invention and are explanatory views of its assembling states.

DESCRIPTION OF THE PREFERRED EMBODIMENTS

Figure 1:
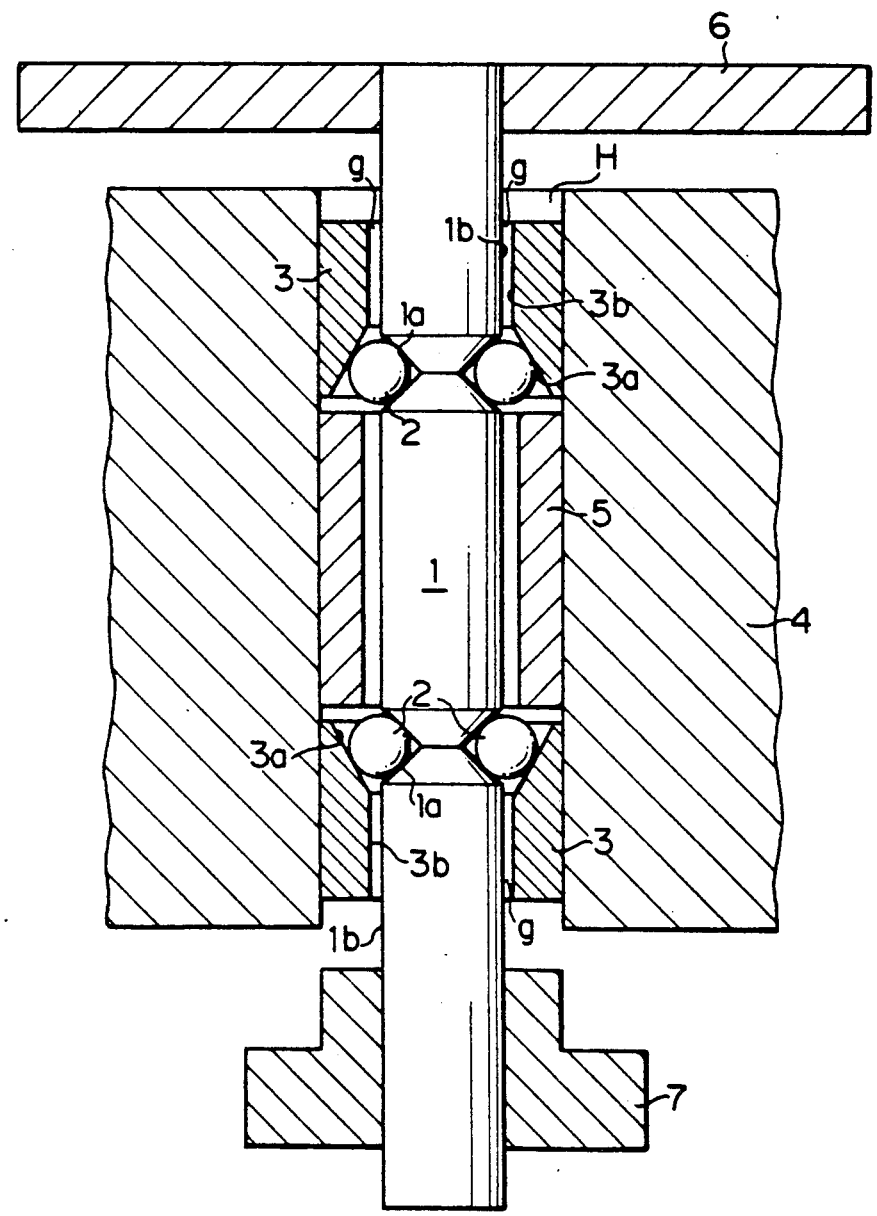
FIG. 1 is a schematic view of the first embodiment of the present invention in vertical section.

In FIG. 1 showing the first embodiment of the present invention, substantially V-shaped grooves 1a for receiving balls 2 are formed as separated from each other respectively in the upper part and lower part in the outer periphery of a cylindrical columnar shaft 1, for example, by cutting or grinding over the entire periphery and a proper number of balls 2 are rotatably received in each of these grooves 1a. The balls 2 are rotatably engaged in contact with a tapered surface 3a formed in a part of each of substantially cylindrical outer races 3. The outer race 3 is provided around the outer periphery of the shaft 1 and outside the balls 2 and has the above mentioned tapered surface 3a formed at the inner end. The outer peripheral surface 1b of the shaft 1 and the inner peripheral surface 3a of the outer race 3 opposed thereto are not in contact with each other to form a dust preventing clearance g and a cylindrical sleeve 5 is provided between the pair of outer races 3. This sleeve 5 serves to prevent the balls 2 from dropping in assembling, is fixed to the inner peripheral surface of the bore H of a bearing housing 4, has the respective outer ends positioned near the balls 2 and is not in contact with the outer races 3, balls 2 and shaft 1. In some case, the sleeve 5 may be attached to the shaft 1 side. The respective outer races 3 are also fixed to the inner peripheral surface of the bore H of the bearing housing 4.

If this assembly is to be used for the above mentioned devices, a pulley 7 may be provided in the lower part of the shaft and a rotor 6 such as a pulley, disc, turntable or drum may be provided in the upper part of the shaft 1 to form a rotary structure.

In assembling, first of all, the sleeve 5 is fixed by pressing substantially at the middle of the bore H of the bearing housing 4 and the shaft 1 is inserted into the sleeve 5. Then, a proper number of the balls 2 on the upper or lower side are put into the corresponding ball 2 receiving groove 1a and grease or oil is poured into that part. Then, the outer race 3 to be positioned on the opening side of the bore H is inserted into the bore H against balls 2 with the tapered surface 3a and is fixed in a proper position on the inner peripheral surface of the bearing housing 4. Then, the balls 2 and outer race 3 on the other side may be mounted in the same manner. The rotor 6 and pulley 7 are then fitted on the shaft 1.

In the above mentioned assembling step, before the rotor 6 and pulley 7 are fixed, the rotating precision of the shaft 1 can be confirmed and, by finely adjusting the position of the outer race 3, the clearance with the balls 2 can be easily adjusted and a favorable rotation performance can be obtained.

In use, the inner peripheral surface 3b of the outer race 3 is so close to the outer peripheral surface 1b of the shaft 1 that, by the clearance g of this fine gap, the entry of dust or the like into the ball part can be minimized.

Figure 2:
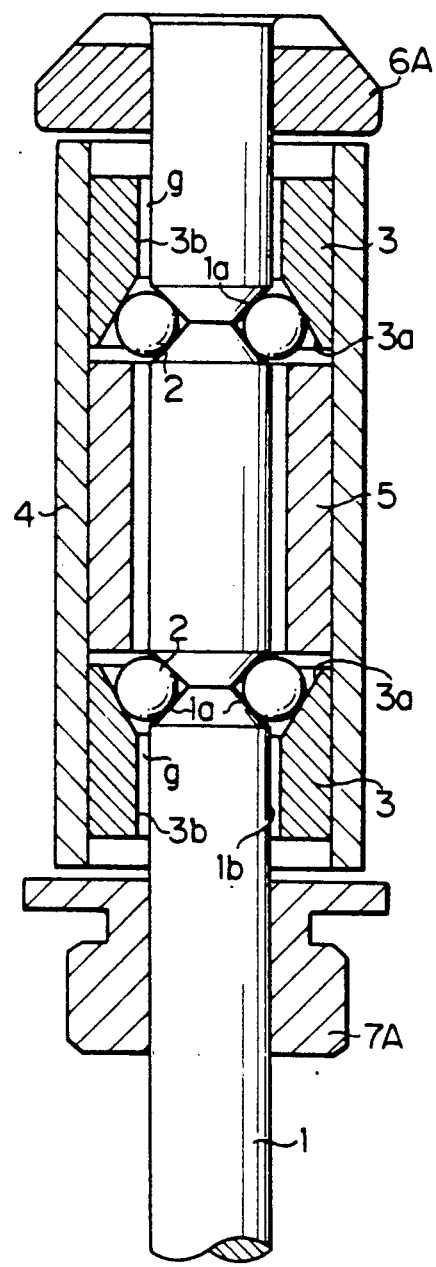
FIG. 2 shows the second embodiment of the present invention.

FIG. 2 is different from the first embodiment in that the shaft 1 is fixed and the bearing housing 4 is formed as a cylindrical member and is made rotatable so as to be able to be used, for example, as a tape guide roller. Flanges 6A and 7A are provided respectively at the upper part and lower part the shaft 1. The other construction is the same as in the first embodiment, and therefore, the same members are designated by the same reference numerals and no detailed explanation shall be made.

Figure 3:
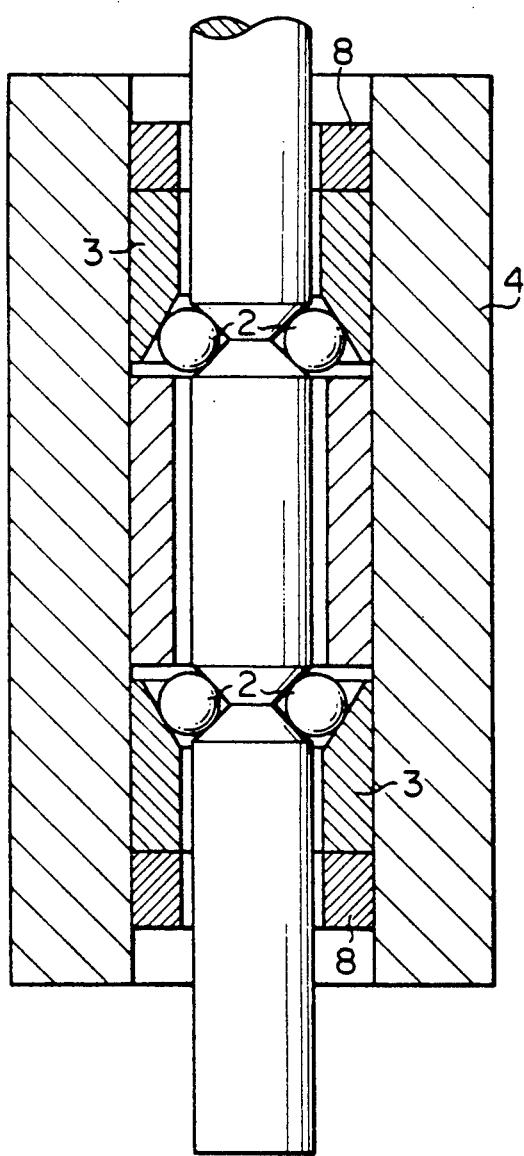
FIG. 3 shows the third embodiment of the present invention.

FIG. 3 shows a construction in which the outer race 3 is not fixed but is made slidable on the inner peripheral surface of the bearing housing 4 and is fixed by an outer race presser 8 provided outside the outer race 3 and fixed to the inner peripheral surface of the bearing housing 4 and, in such case, both or either one of the upper and lower outer race pressers 8 is made of an elastic member such as rubber so as to apply a pre-pressure to the outer race 3 in contact with the balls 2 and to prevent a backlash from being caused by the abrasion of the ball rolling surface.

The other constructions is the same as in the first and second embodiments.

Figure 4:
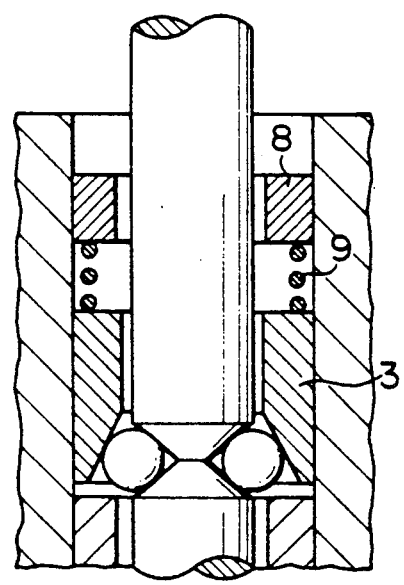
FIG. 4 shows the fourth embodiment of the present invention.

FIG. 4 shows the fourth embodiment of the present invention. In this embodiment, a resilient member such as a spring 9 is provided between the outer race 3 and outer race presser 8 so as to apply a pre-pressure to the outer race 3.

Figure 5:
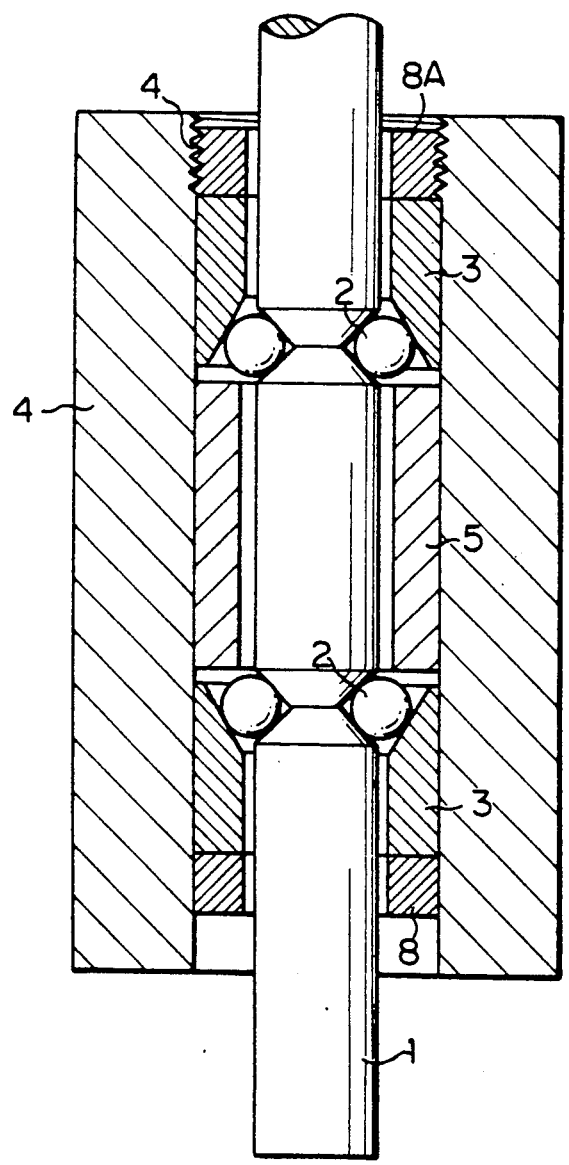
FIG. 5 shows the fifth embodiment of the present invention.

FIG. 5 shows the fifth embodiment of the present invention. In this embodiment, either one of the outer race pressers is made as an adjusting screw 8A structure. Threads are formed on the inner peripheral surface of the bearing housing 4 so that the position of the outer race 3 may be adjusted by the outer race adjusting screw 8A to adjust the clearance between the balls 2 and outer race 3. The other outer race presser 8 is fixed to the bearing housing 4.

Figure 6:
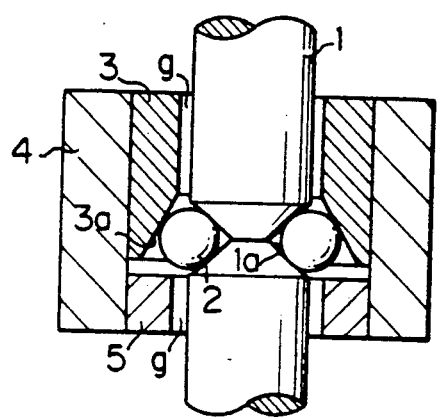
FIG. 6 shows the sixth embodiment of the present invention.

FIG. 6 shows the sixth embodiment of the present invention. In the first to fifth embodiments, two ball parts are provided but, in the subsequent embodiments, one ball part is provided only on one side.

That is to say, a groove 1a is formed in a part on the outer periphery of the columnar shaft 1 and the balls 2 are held by this groove 1a and a ball receiving surface 3a of the outer race 3 fixed to the inner peripheral surface of the bearing housing 4. A short cylindrical sleeve 5 is fixed to the inner peripheral surface of the bearing housing 4 near the balls 2 and the ball receiving surface 3a of the outer race 3. A dust preventing clearance g is formed between the inner peripheral surfaces of the outer race 3 and sleeve 5 and the outer peripheral surface of the shaft 1.

In assembling, the sleeve 5 is fixed within the bearing housing 4, then the shaft 1 is inserted into the sleeve 5 and a proper number of the balls 2 are put in from the other side and are positioned within the groove 1a. In such case, the balls 2 are prevented by the sleeve 5 from dropping. Then, the outer race 3 may be put into the bearing housing 4 and may be fixed in a proper position. As required, the other part of the shaft 1 may be supported by an ordinary radial ball bearing, plane bearing or pivot bearing.

Figure 7:
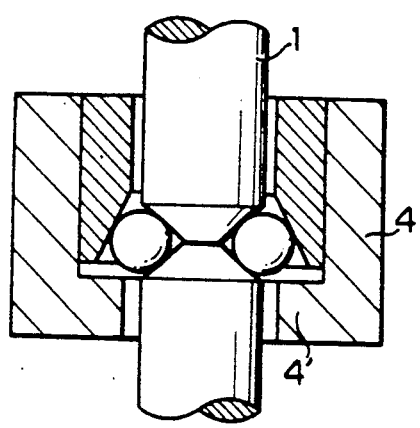
FIG. 7 shows the seventh embodiment of the present invention.

FIG. 7 shows the seventh embodiment of the present invention. This embodiment is different from the sixth embodiment in that a sleeve 4' extending toward the shaft 1 is integrally formed on the inner peripheral surface of the end part of the bearing housing 4. The other construction is the same.

Figure 8:
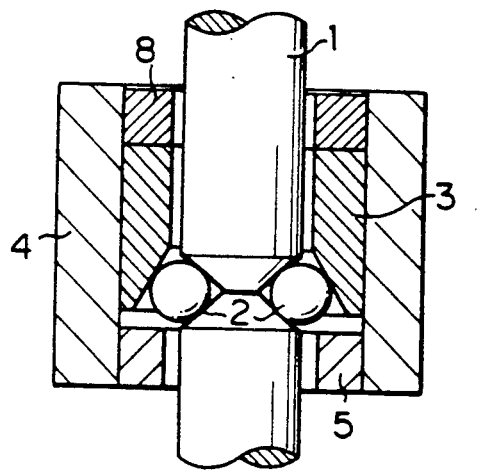
FIG. 8 shows the eighth embodiment of the present invention.

FIG. 8 shows the eighth embodiment of the present invention. In this embodiment, the outer race 3 in the sixth embodiment is loosely fitted within the bearing housing 4 and is fixed by the outer race presser 8 made as an elastic member and arranged outside the outer race 3 so as to give a pre-pressure by the elasticity of the outer race presser 8 and to prevent a backlash from being caused by the abrasion of the ball rolling surface. The other construction is the same as in the sixth embodiment.

Figure 9:
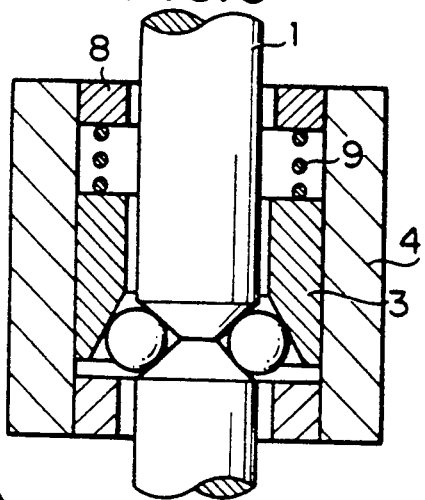
FIG. 9 shows the ninth embodiment of the present invention.

FIG. 9 shows the ninth embodiment of the present invention. This embodiment is different from the eighth embodiment in that the outer end of the outer race 3 loosely fitted within the bearing housing 4 and the inner end of the outer race presser 8 to be fixed within the bearing housing 4 are separated from each other and a resilient member 9 such as a spring is provided between them so as to apply a pre-pressure to the outer race 3. In such case, the outer race presser 8 is not specifically required to be an elastic member.

Figure 10:
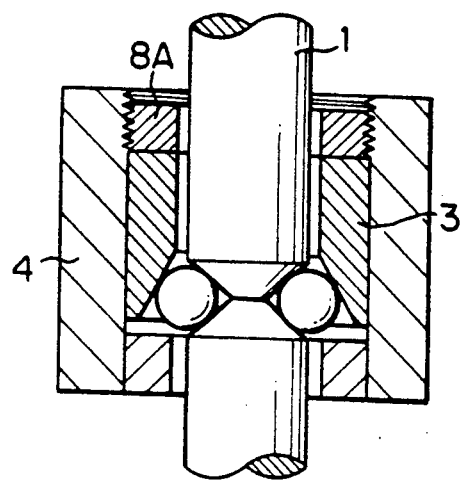
FIG. 10 shows the tenth embodiment of the present invention.

FIG. 10 is of the tenth embodiment of the present invention. In this embodiment, the outer race adjusting screw 8A is provided outside the outer race 3 and on the inner peripheral surface of the bearing housing 4 so as to make it possible to adjust the clearance.

Figure 11A:
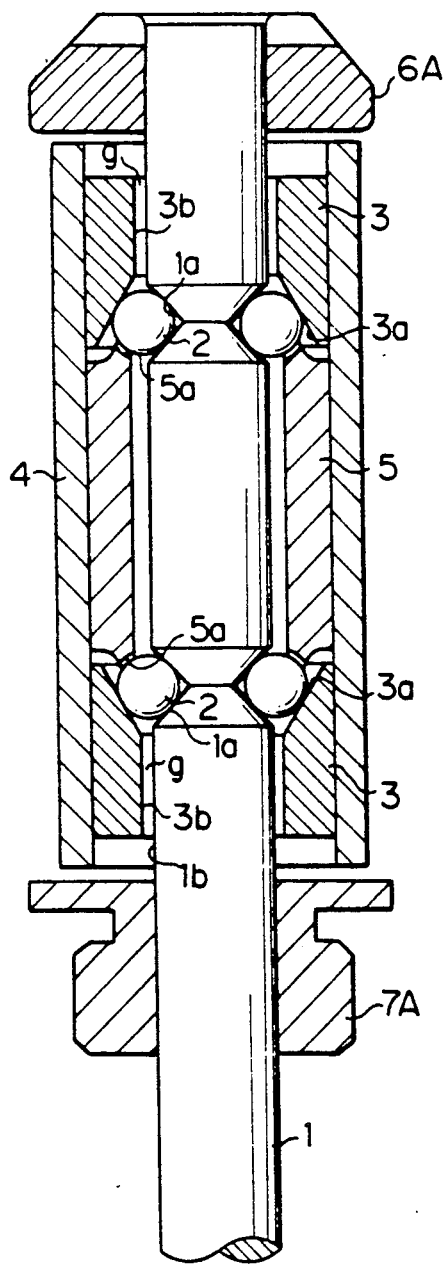
FIG. 11a is a vertical sectional view of the eleventh embodiment of the present invention.
Figure 11B:
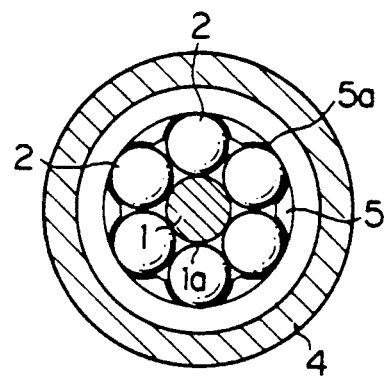
FIG. 11b is an explanatory plan view showing balls as spaced and FIG. 11c shows an outer race in another mode.

FIGS. 11 (7a) to (d) show the eleventh embodiment of the present invention. In the rotary structure in each of the above described embodiments, the balls in formed on the outer periphery of the shaft 1 by the tapered surface 3a of the outer race 3 provided within the bearing housing 4, the dust preventing clearance g is formed between the inner peripheral surface 3b of the outer race 3 and the outer peripheral surface 1b of the shaft 1 and the sleeve 5 is provided within the bearing housing 4 to prevent the balls 2 from dropping in assembling so that the cost may be reduced, the number of component parts may be decreased, the shape may be simplified, the assembling may be made easy, the size may be made small, the weight may be made light and the performance may be sufficient in practice.

However, in the rotary structure of the above mentioned construction, the balls 2 arranged around the shaft 1 are generally intended to be full balls and, in such case, there are problems that, above a medium speed of rotation, the balls will collide with one another to make noise and undergo mechanical loss.

Therefore, in this eleventh embodiment, the noise generation and mechanical loss are reduced.

That is to say, this embodiment is characterized in that a means of holding the balls at proper intervals with each other is provided so that the balls may be separated from each other and may not collide with each other whereby, the noise generation and mechanical loss is controlled to a minimum and the sleeve 5 is made to function as a retainer.

This sleeve 5 can be formed of a resin such as, for example, Dellulin, has the function as a retainer holding the balls 2, has a required number of semicircular grooves 5a of a size larger than the ball 2 and correspond to the number of the balls at proper intervals, the balls 2 being received in the respective grooves 5a and held at proper intervals from each other.

In assembling, first of all, the sleeve 5 is fixed as by pressing substantially in the middle of the bearing housing 4 and the shaft 1 is inserted into the sleeve 5. Then, a proper number of the balls 2 on the upper or lower side are put into the corresponding grooves 5a and are received by the ball receiving groove 1a of the shaft 1 and grease or oil is poured into that part. Then, the outer race 3 to be positioned on the opening side is put into the bearing housing 4 from the opening to press the balls 2 with the tapered surface 3a and is fixed in a proper position on the inner peripheral surface of the bearing housing 4. The balls 2 and outer race 3 on the other side may be put in in the same manner and, in the case of using the rotary structure as a roller, the upper and lower flanges 6A and 7A may be fixed to the respective ends of the shaft 1. In the above mentioned assembling step, before the upper and lower flanges 6A and 7A are fixed, the rotation precision of the bearing housing 4 can be confirmed and, by finely adjusting the position of the outer race 3, the clearance with the balls 2 can be easily adjusted and a favorable rotation performance can be obtained. The inner peripheral surface 3b of the outer race 3 is so close to the outer peripheral surface 1b of the shaft 1 that, the dust preventing clearance g of this fine gap, minimizes the entry of dust or the like into the ball part.

The sleeve 5 is fixed to the inner peripheral surface of the bearing housing 4 with a bonding agent or by press fit but it may be fixed to the outer peripheral surface of the shaft and separated from the housing 4 to obtain the same function.

Figure 11C:
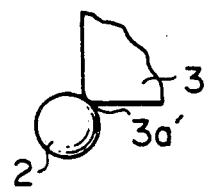

Also, the tapered surface 3a is formed at the inner end of the outer race 3 but the balls 2 may be received by the inner corner part 3a' of a cylindrically formed outer race 3 as shown in FIG. 11(c) instead of the tapered surface 3a. That is to say, when the outer race 3 is barrel-ground in its production, the corner part will be somewhat rounded in this step. Therefore, the balls 2 may be received by this rounded part. In such case, the outer race 3 is not positively required to be provided with the tapered surface 3a, therefore can be that much simpler in form, can be easier to make and can be lower in cost. This structure can be applied also to the above described respective embodiments.

In this embodiment, the sleeve is made to function as a retainer, and no retainer is separately formed and therefore the cost is that much lower.

Figure 12A:
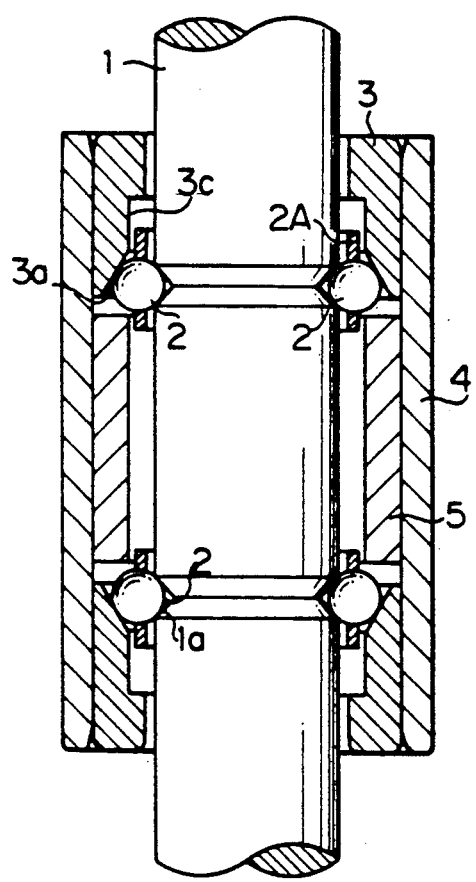
FIG. 12a is a vertical sectional view of the twelfth embodiment of the present invention.
Figure 12B:
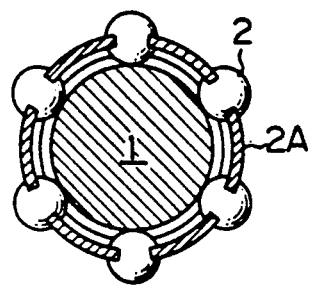
FIG. 12b is an explanatory plan view showing balls as spaced.

FIGS. 12(a) and (b) show the twelfth embodiment of the present invention. This embodiment is different from the above described embodiment in that a means as holding the balls at proper intervals with each other is formed of a retainer 2A separately from sleeve 5.

Therefore, the sleeve 5 is merely cylindrical and is provided on the inner perpheral surface of the bearing housing 4 and is not in contact with the respective members. By the way, this sleeve 5 is to prevent the balls 2 held by the ring-shaped retainer 2A in assembling from dropping. A retainer 2A escaping part 3c is formed in the outer race 3. The other formations are the same as in the eleventh embodiment.

In assembling, first of all, a proper number of the balls 2 are put as arranged at intervals into the retainer 2A, for example, within a jig (not illustrated). This jig is made to have a magnetic force or attraction so that the balls 2 will not drop while being assembled.

On the other hand, the sleeve 5 is press fit substantially in the middle of the bearing housing 4 and the shaft 1 is inserted into the sleeve 5. Then, the balls held at intervals by the retainer 2A on the upper or lower side are partly received in the groove 1a and grease or oil is poured in that part. Then, the outer race 3 is inserted into the bearing housing 4 to press the balls 2 by the tapered surface 3a and race 3 is fixed in position on the inner peripheral surface of the bearing housing 4. Then, the balls 2 and outer race 3 on the other side are inserted in the same manner. The upper and lower flanges 6 and 7 may be fixed to the respective ends of the shaft 1.

Figure 13:
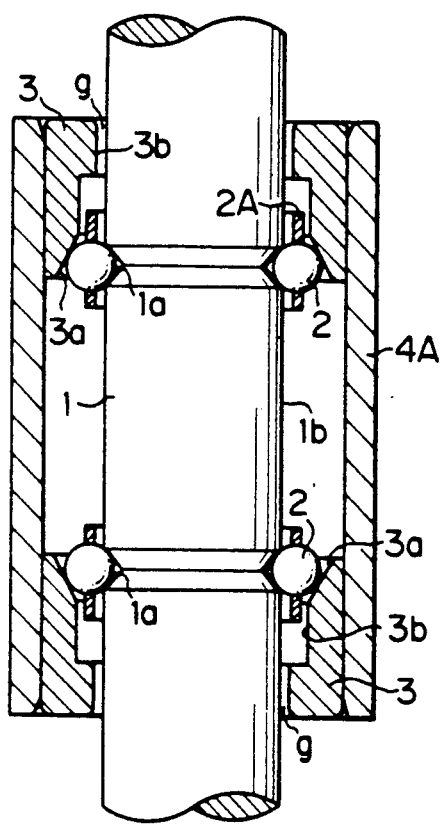
FIG. 13 shows the thirteenth embodiment of the present invention.

FIG. 13 shows the thirteenth embodiment of the present invention. In this embodiment, the sleeve 5 for preventing the balls 2 from dropping in the above described twelfth embodiment is not required and the assembling is made that much easier.

Figure 14A:
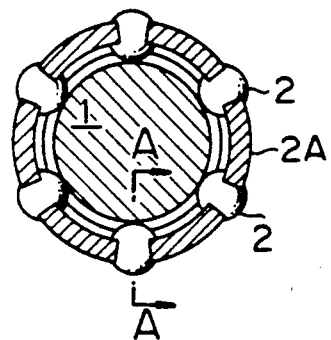
FIG. 14(a) is an explanatory plan view showing balls as incorporated in a retainer and provided around the shaft.
Figure 14B:
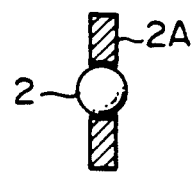
FIG. 14(b) is a sectional view taken on line A—A in FIG. 14(a).
Figure 15:
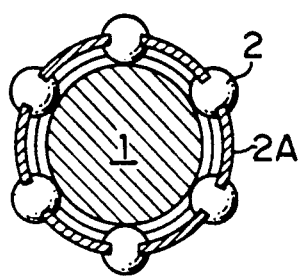
FIGS. 15 and 16 show retainers respectively in other modes.
Figure 16:
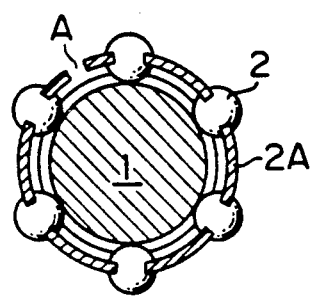

In this case, the retainer 2A is ring-shaped as shown particularly in FIGS. 14(a) and (b) and is made as a resilient member of a resin or metal. The balls 2 are held through ball receiving parts provided at proper intervals and, in this case, consisting of holes of a diameter substantially equal to or somewhat smaller than the ball diameter. That is to say, in this retainer 2A, each ball 2 is forcibly put into a hole which prevents the ball 2 from escaping. The other construction of the retainer 2A may be as shown in FIG. 15 or as shown in FIG. 16 wherein the retainer 2 ring is made of a resilient member having a cut A made in a part so as to be easily variable in the inside diameter.

In assembling, as shown in FIG. 17(1), the retainer 2A in which the balls 2 are incorporated in advance is pushed onto the outer periphery of the shaft 1. In this case, the retainer 2A will be pushed to expand somewhat outward by the shaft 1 and the balls 2 in contact with the shaft 1. That is to say, the retainer 2A is of a diameter naturally larger than of the shaft 1 but will be pushed to expand somewhat outward in diameter against the resiliency of its material when the balls 2 are fitted on the outer periphery of the shaft 1. As shown in FIG. 17(2), when the retainer 2A is pushed on and the balls 2 reach the groove 1a, the retainer 2A will contract that much and the balls 2 will be respectively fitted without dropping. Then, this assembly is inserted into the bearing housing 4 and the outer race 3 is inserted from outside so that a spindle unit may be assembled without using any sleeve.

In use, the inner peripheral surface 3b of the outer race 3 is so close to the outer peripheral surface 1b of the shaft 1 that the entry of dust or the like into the ball part can be minimized by clearance g. See FIG. 11.

FIG. 18 shows the fourteenth embodiment of the present invention. This embodiment is characterized in that the distance between the pair of grooves 1a formed on the outer periphery of the shaft 1 is small and a retainer 2A' is provided with two sets of the balls 2 corresponding to the pair of grooves 1. The basic material and formation of the retainer 2A' are the same as in the above described embodiments.

In assembling, as shown in FIG. 19(1), first of all, the balls 2 incorporated in the retainer 2A' are fitted on the outer periphery of the shaft 1 and are pushed toward the ball receiving parts 1a as indicated by the arrow.

Then, as shown in FIG. 19(2), when the balls 2 located on the lower side in the drawing first reach the groove 1a on the upper side, the balls 2 will fit into the groove 1a due to the resiliency of the retainer 2A'. At this time, the ball part on the upper side will remain pushed to expand outward.

Then, when the balls are further pushed, as shown in FIG. 19(3), the balls in the two upper and lower steps will respectively fit into the grooves 1a so as to be fitted to the outer periphery of the shaft 1.

FIG. 20 shows the fifteenth embodiment of the present invention. In this embodiment, the distance between the pair of grooves 1a formed on the outer periphery of the shaft 1 is small and the retainer for holding the balls and the sleeve for preventing the balls from dropping are not required so that the assembling parts may be decreased and the assemblability may be improved.

That is to say, in assembling, as shown in FIG. 20(1), first the shaft 1 is inserted into a hollow part provided with one outer race 3 at one end of the bearing housing 4 and is arranged in a proper position. Then, in the illustrated state, a proper number of the balls 2 are inserted from the lower side. In this case, a ball receiving jig 6' is used to prevent the balls 2 from dropping. The balls 2 will be supported by the rolling surfaces of the groove 1a and the tapered surface 3a of the outer race. The outer race 3 is fixed in a position for favorably holding the balls 2. Then, as shown in FIG. 20(2), the above mentioned assembly is turned upside down and a proper number of balls 2' are inserted between the bearing housing 4 and shaft 1 from the upper side.

Then, as shown in FIG. 20(3), the other outer race 3' is inserted into the bearing housing 4 and, as shown in FIG. 20(4), the balls 2' are supported by the tapered surface 3a' of this outer race 3' and the groove 1a' and the outer race 3' is fixed in a proper position so that a light, thin and short spindle unit may be assembled. That is to say, in the spindle unit of this invention, the distance between the grooves 1a and 1a' is small, no sleeve is required, the weight is reduced, the balls 2 and 2' are held directly by the shaft 1 and the outer races 3 and 3' provided on the outer periphery of the shaft 1 and therefore the type is thin.

In use, the inner peripheral surfaces 3b and 3b' of the outer races 3 and 3' are so close to the outer periphery 1b of the shaft 1 that the entry of dust or the like into the ball parts can be minimized by the dust preventing clearance g. See FIG. 20(4).

Figure 21:
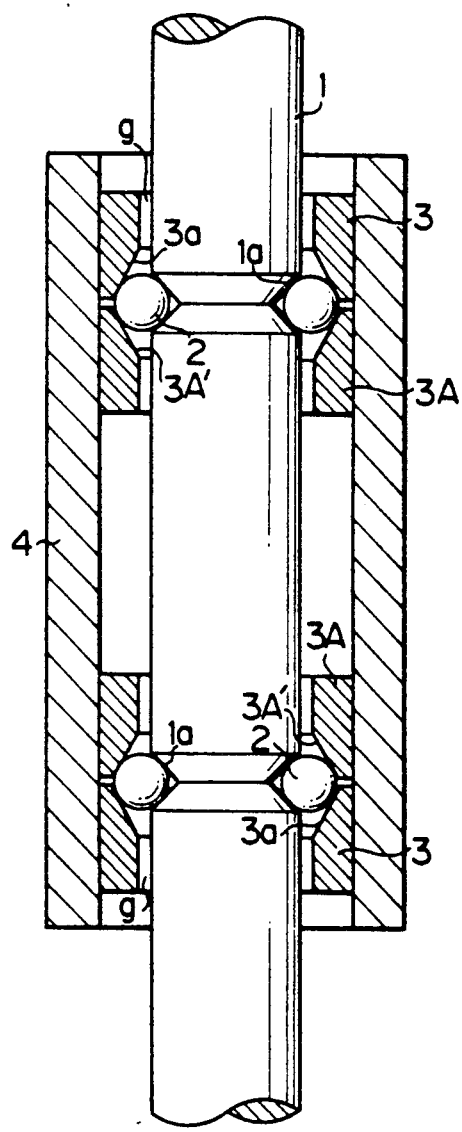
FIG. 21 shows the sixteenth embodiment of the present invention.

FIG. 21 shows the sixteenth embodiment of the present invention. This embodiment is different from the above described respective embodiments in that the means for preventing the balls 2 from dropping is formed of a second outer race having a tapered surface.

That is to say, in the drawing, 3A is the second outer race for receiving the balls 2 provided in the upper or lower part and fixed by pressing in or bonding to the inner peripheral surface of the cylindrical bearing housing 4 arranged concentrically around the shaft. A tapered surface 3A' is formed at the inner end of each of these outer races 3A so as to form a substantially V-shaped groove together with the first outer race 3 on the outside. The balls 2 are held by these tapered surfaces 3a and 3A' and the substantially V-shaped ball receiving groove 1a formed on the outer peripheral surface of the shaft 1.

Also, a fine dust preventing gap g is formed between the inner peripheral surface of the first outer race 3 on the outside and the opposed outer peripheral surface of the shaft 1.

In assembling, first of all, the second outer race 3A on the inside is fixed by pressing in or bonding in a proper position within the bearing housing 4 so that its tapered surface 3A' may be positioned outside.

Then, a proper number of the balls 2, for example, in the upper part are put into the second outer race 3A, lubricant as grease is poured into that part and then the first outer race 3 to be positioned on the upper outside is inserted and fixed within the bearing housing 4 around the outer periphery of the shaft 1.

Then, the assembly is turned upside down and, in the illustrated state, now a proper number of the balls 2 to be positioned on the lower side are put into the second outer race 3A in the same manner and then the first outer race 3 is inserted and fixed.

In such case, by fixing the first outer races 3 in the upper and lower parts as by pressing or bonding while confirming the clearance from the ball part and rotary torque, any desired performance can be obtained.

The entry of dust or the like into the ball part can be minimized by the dust preventing gap g.

Figure 22:
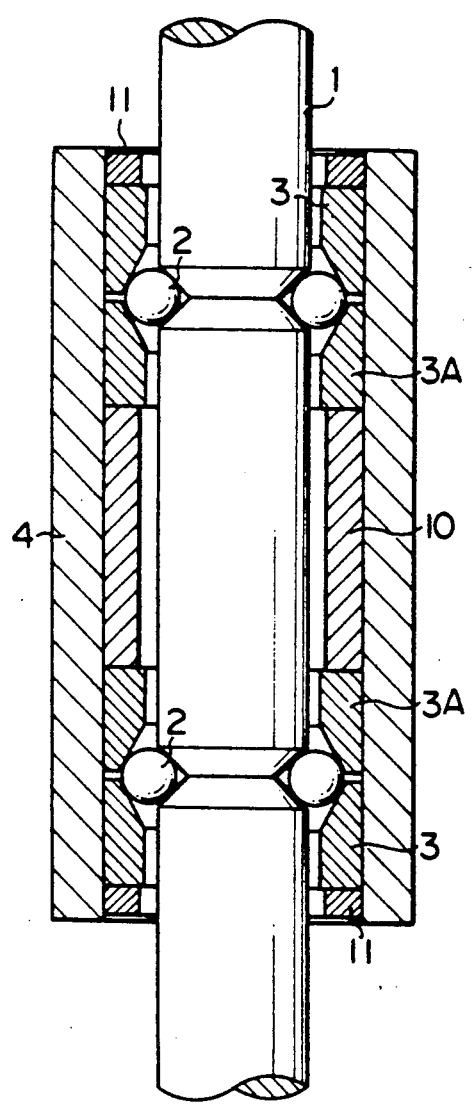
FIG. 22 shows the seventeeth embodiment of the present invention.

FIG. 22 shows the seventeenth embodiment of the present invention. In this embodiment, a cylindrical outer race damper 10 made of an elastic member such as rubber is provided between the second outer races 3A and 3A on the inside within the bearing housing 4 so that a pre-pressure by its resiliency may act on the respective outer races 3A in contact with the balls and a backlash may be prevented from being caused by the abrasion of the ball rolling surface. Therefore, in this case, the respective outer races 3A are slidably fitted in the inner peripheral surface of the bearing housing 4 without being fixed. The outside first outer races 3 are fixed. The outer race pressers 11 are respectively provided outside them as required on the inner peripheral surface of the bearing housing 4. The other construction is the same as in the thirteenth embodiment.

In assembling, first of all, the outer race damper 10 is inserted on the inner peripheral surface within the bearing housing 4, the shaft 1 is inserted in the center within the outer race damper 10 through a jig (not illustrated), the outer race 3A, for example, on the upper side is inserted into the bearing housing 4, then the balls 2 and lubricant are put into the outer race 3A, then the outer race 3 is inserted into the bearing housing 4 and is fixed with the outer race presser 11. Then, on the other side, the respective members are incorporated in the same manner.

Figure 23:
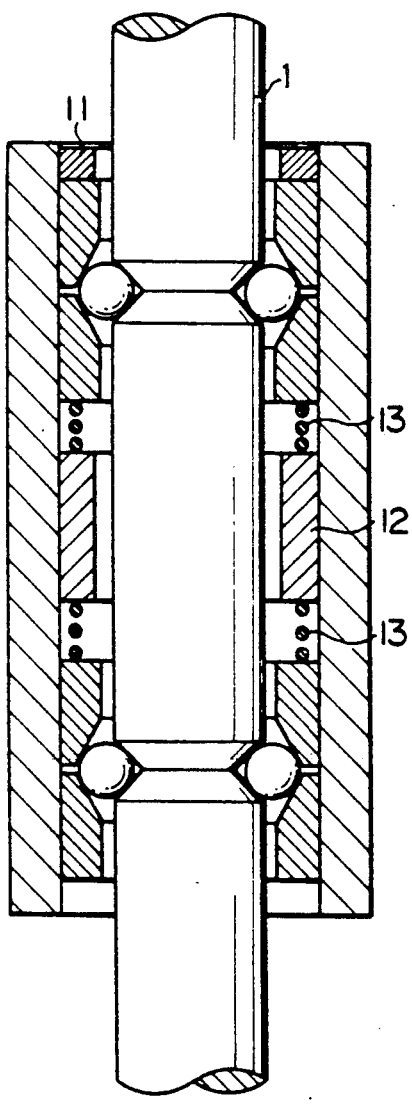
FIG. 23 shows the eighteenth embodiment of the present invention.

FIG. 23 shows the eighteenth embodiment of the present invention. This embodiment is different from the seventeenth embodiment in that the outer race damper 10 is replaced with a cylindrical spring stopper 12 fixed in the middle between the outer races 3A and 3A and springs 13 respectively contact both ends of the stopper 12 and the ends of the respective outer races 3A. The other construction and operations are fundamentally the same.

In the seventeenth and eighteenth embodiments, even if a pre-pressure is made to act only on either one of the outer races 3A, there will be practically no problem. In such case, in the eighteenth embodiment, the outer race presser on the lower side will not be required.

Also, the outer race 3 on the outside may not be required in some case. A sealing member may be put in.

Figure 24:
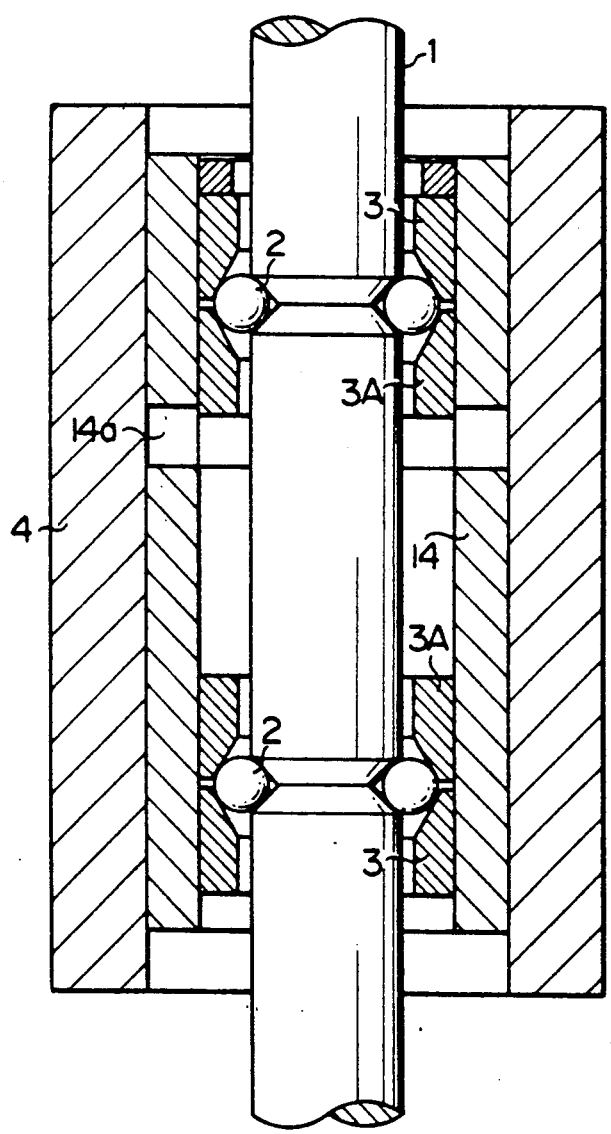
FIG. 24 shows the nineteenth embodiment of the present invention.

FIG. 24 shows the nineteenth embodiment of the present invention. This embodiment is characterized in that a cylindrical bearing outer tube 14 having a hole 14a formed in a predetermined position is provided between the bearing housing 4 and outer races 3 and 3A so that the position of the inside outer race 3A may be adjustable in the axial direction by utilizing the hole 14a in the course of the assembling step and the clearance from the ball part and the rotary torque may be adjustable.

Now, the assembling of this embodiment shall be explained.

First of all, the outer race 3A on the lower side is fixed in a predetermined position within the bearing outer tube 14 by pressing in or bonding.

Then, the shaft 1 is arranged in a predetermined position through a jig (not illustrated), the balls 2 and lubricant for that part are put in and the outer race 3 on the lower side is fixed.

Then, this assembly is turned upside down, an adjusting lever (not illustrated) is put into the hole 14a of the bearing outer tube 14 from the outer peripheral part side, the outer race 3A on the other side is inserted into the bearing outer tube 14 from the upper opening, then the balls 2 are inserted into the outer race 3A and the corresponding outer race 3 is inserted into the bearing outer tube 14.

Then, the positions of the outer races 3 and 3A and the balls between them are adjusted by using the lever and the outer race presser is fixed by pressing in, bonding or screwing in while confirming the clearance from the ball part and the rotary torque.

Then, the lever may be pulled out and the above mentioned assembly may be inserted and fixed within the bearing housing 4.

In the above mentioned twelfth to nineteenth embodiments, the outer race having the tapered surface positively formed is used. However, generally, the outer race is barrel-ground. Therefore, even a merely ring-shaped one will have the corner part somewhat rounded and substantially tapered. Therefore, the balls can be contracted by such part. In such case, the outer race will be easy to make.

Figure 25:
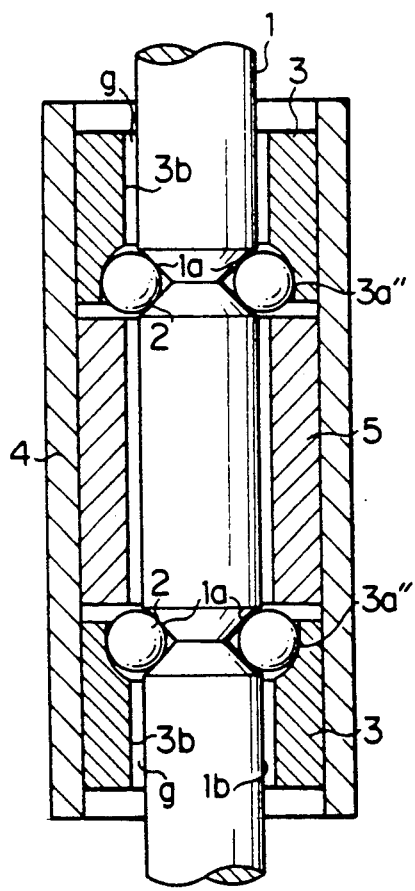
FIG. 25 shows the twentieth embodiment of the present invention.

FIG. 25 shows the twentieth embodiment of the present invention. This embodiment is different from the above described embodiments in that the ball receiving tapered part of the outer race 3 is replaced with a ball receiving concave spherical part 3a" of a diameter larger than of the ball 2. The other construction is the same.

Such outer race 3 can be applied to the other embodiments.

Figure 26:
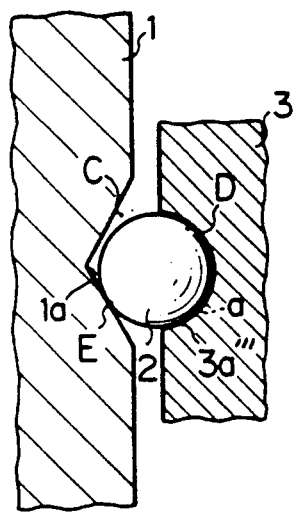
FIG. 26 is a partial sectional view of the twenty-first embodiment of the present invention.
Figure 27:
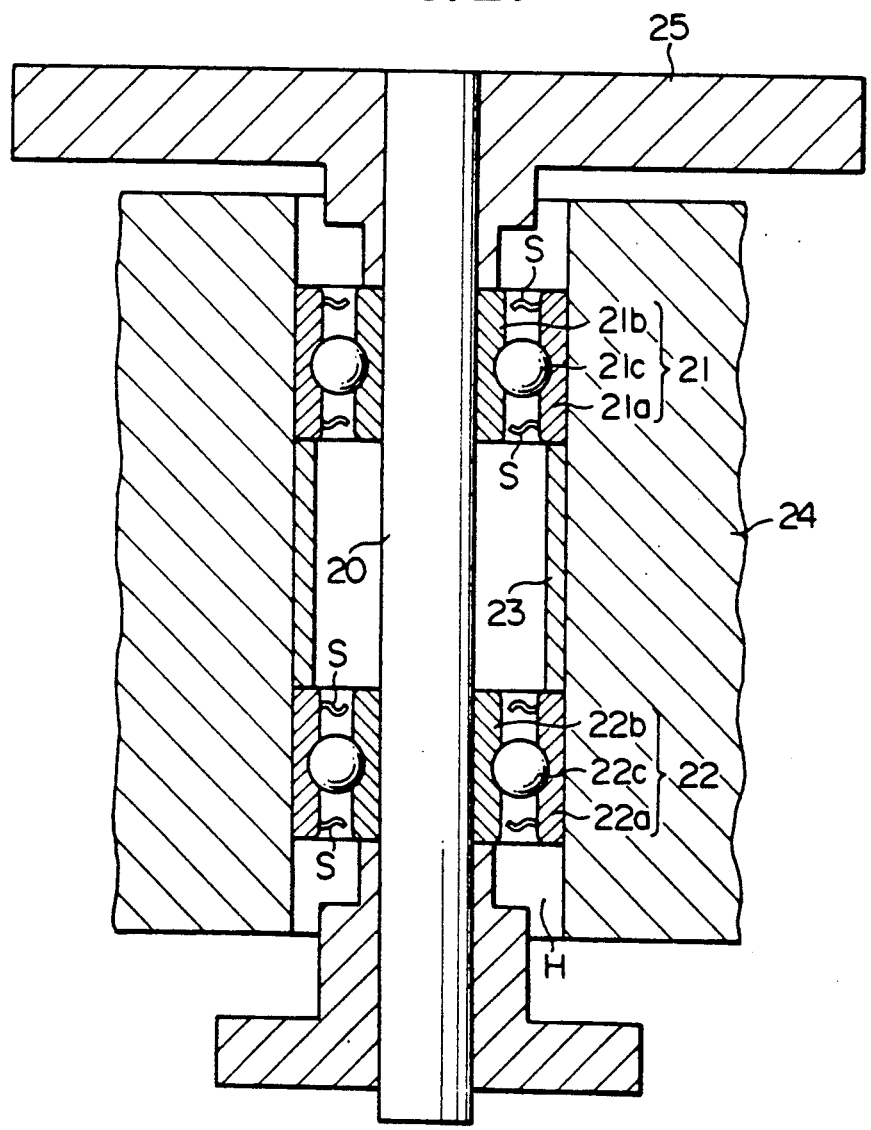
FIG. 27 shows a prior art example.

FIG. 26 shows the twenty-first embodiment of the present invention. In the case that the ball receiving concave spherical part 3a" shown in FIG. 25 is to be formed in the outer race 3, if the outer race 3 is ground by using an existing grinding machine, generally the outer race 3 will be displaced by the grinding resistance and will not be able to be ground as expected.

Therefore, in this embodiment, the outer race 3 is somewhat extended at the lower end so as to be easy to grind. That is to say, the length to the broken line a is of the ball receiving part 3" of the outer race 3 of the twentieth embodiment in FIG. 25. This ball receiving surface 3a" is of a concave spherical surface partly cut off, whereas, in this embodiment, the ball receiving surface 3a''' is further extended at the lower end so as to be of a shape rather close to a concave spherical surface.

In such case, the outer race 3 is to be fitted around the balls 2 provided on the outer periphery of the groove 1a of the shaft 1 by applying a small force in assembling and is extended at the lower end so as not to obstruct the incorporation.

In case the incorporation is obstructed, the obstructing part may be cut off and removed and the ball receiving surface 3a of the above described respective embodiments may be made.

It is preferable that, in case the contact points E and D of the ball 2 respectively with the shaft 1 and outer race 3 are on the straight line passing through the center of the ball 2, the ball 2 will not contact the shaft 1 in the part C between them and will contact the shaft 1 and outer race 3 respectively at one point.

As in the above, according to the present invention, without using a radial ball bearing, a ball receiving groove of a semicircular cross-section is formed on a shaft, balls are held by the ball rolling surface of this groove and the ball receiving surface of an outer race provided on the inner peripheral surface of a bearing housing, no expensive radial ball bearing of a double sealing structure is required and the cost can be that much reduced.

The minimum component parts around the shaft may be the balls, outer race, sleeve provided as required and bearing housing and the component parts and are decreased as compared to known constructions are simple in their shapes, easy to make, low in the cost and easy to assemble.

The balls are partly contained in the ball receiving groove on the shaft, therefore the type can be made small and the number of the component parts is so small that the weight can be reduced.

In case the contour is the same as in the past, the ball diameter can be made that much larger and therefore the rigidity can be improved.

In the conventional radial ball bearing, in order to make the clearance between the inner race and outer race have a width, the dimensions of the outside diameter of the inner race and the inside diameter of the outer race had to be measured so as to be combined by keeping a proper clearance with respect to the diameter of the balls but, in the present invention, such complicacy is unnecessary, if the position of incorporating the outer race is displaced, the diameter of the balls can be made somewhat larger and, in this respect, too, the rigidity can be improved.

Further, in assembling, by finely adjusting the position of the outer race, the clearance can be freely and easily adjusted.

What is claimed is:

1. A rotary structure for a VTR or floppy disc drive comprising a cylindrical shaft having an outer surface provided with a substantially annular V-shaped groove therein, a plurality of balls seated in said groove and projecting beyond an outer surface of the shaft, an outer race surrounding the outer surface of the shaft and having an inner tapered surface in contact with said balls for holding said balls in said groove with a predetermined pressure, a bearing housing surrounding said shaft and having an inner peripheral surface to which said outer race is fixed, said shaft having a second annular V-shaped groove axially spaced from the first said V-shaped groove and a plurality of further balls in said second groove, a second outer race surrounding the outer surface of the shaft and having an inner tapered surface in contact with the balls in the second groove for holding said balls therein under pressure, said second race being fixed to said inner surface of said housing, said V-shaped grooves being substantially adjacent to one another so that the balls in the first and second V-shaped grooves face one another in close proximity.

2. A rotary structure as claimed in claim 1 wherein said shaft and said outer races form small gaps therebetween constituting means for preventing dust passage therethrough.

3. A rotary structure as claimed in claim 1, said shaft having opposite ends projecting from said bearing housing, rotor means on one of said ends of said shaft and pulley means on the other of said ends of the shaft.

4. A rotary structure as claimed in claim 3 wherein said shaft is vertical and said pulley means is at the lower end of the shaft.

5. A rotary structure as claimed in claim 1 wherein the balls in the first and second V-shaped grooves are axially spaced from one another by a distance less than the diameter of said balls.

6. A rotary structure as claimed in claim 1 wherein the inner tapered surfaces of the first and second outer races taper in narrowing fashion towards one another and said races have narrow ends facing one another.

* * * * *